Feb. 26, 1935.   R. A. MONROE ET AL   1,992,538
VIBRATION DAMPER
Filed March 31, 1933

INVENTORS
ROBERT ANSLEY MONROE
RICHARD L. TEMPLIN
BY
ATTORNEY

Patented Feb. 26, 1935

1,992,538

UNITED STATES PATENT OFFICE 1,992,538

VIBRATION DAMPER

Robert A. Monroe, Mount Lebanon, and Richard L. Templin, New Kensington, Pa., assignors to Aluminum Company of America, Pittsburgh, Pa., a corporation of Pennsylvania Application March 31, 1933, Serial No. 663,736

6 Claims. (Cl. 173—13)

This invention relates to vibration dampers for electrical transmission lines and the like. It relates particlarly to vibration dampers of the type disclosed in U. S. Patent No. 1,675,391, to Stockbridge, in which suitable weights or inertia masses are attached to a resilient member supported from a transmission line, preferably near its point of support. An improved form of vibration damper of this type, to which the present invention more specifically relates, is described and claimed in a copending application, Serial No. 663,748, filed March 31, 1933.

The principal object of this invention is to provide an improved device for preventing objectionable vibrations in suspended transmission lines and the like. Another object is to provide an improved means for attaching the inertia members of a vibration damper to a resilient member by which they are supported from a transmission line. These and other objects of this invention will be more fully appreciated from the following description and the accompanying drawing, in which:

Figs. 3 and 4 are views showing a preferred clamping member for attaching a vibration damper to a transmission line, in open and closed positions respectively, Fig. 4 being a view taken on the line IV—IV of Fig. 2;

Fig. 5 is a still further enlarged elevational view, with parts broken away, of a tapered sleeve or collet which forms an important part of this invention; and Fig. 6 is an end view of the tapered sleeve shown in Fig. 5. Similar reference numerals designate similar parts in all of the views.

Figure 1:
Fig. 1 is a somewhat diagrammatic elevational view of a section of a transmission line with vibration dampers attached thereto.
Figure 2:
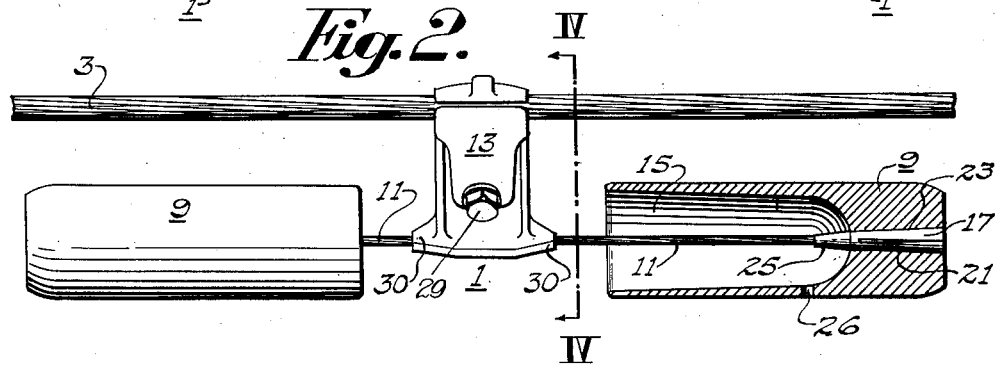
Fig. 2 is an enlarged view, partly in elevation and partly in section, showing a vibration damper embodying our invention in operative position on a transmission line.
Figure 2:
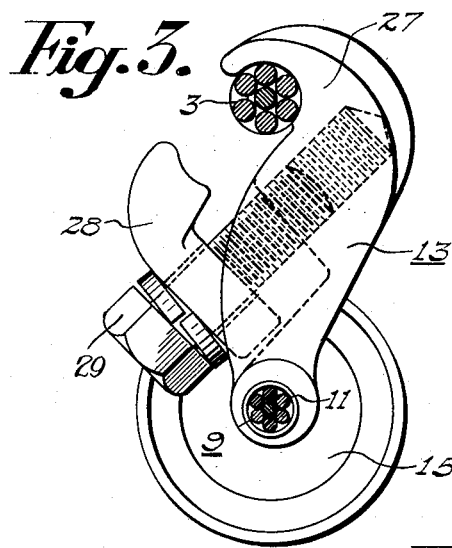
Figure 2:
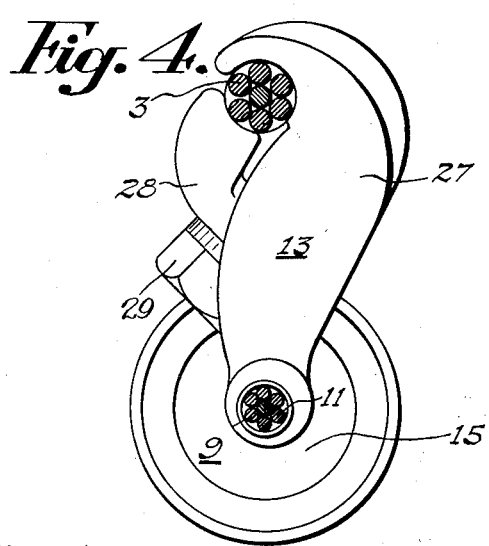
Figure 2:
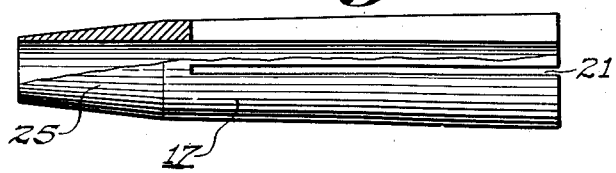
Figure 2:
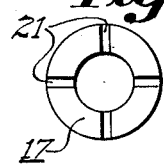

As shown in Fig. 1, our improved vibration dampers 1 are attached to the conductor 3 of an electrical transmission line, usually near one of its supports, which may be a clamp 5 suspended from an insulator 7. The damper 1 comprises two inertia members 9 joined together by a resilient member 11, which is preferably a short length of stranded cable. This resilient member is engaged intermediate its ends and preferably substantially at its center by a clamping device 13 adapted to engage the transmission line 3 to support the damper therefrom. This clamp 13 may be of any suitable construction, but is preferably of the type shown in Figs. 3 and 4 and described in more detail hereinbelow.

The inertia members or damping weights 9 are preferably, but not necessarily, of the cup-shaped or recessed cylindrical type described in the copending application referred to hereinabove. In inertia members of this type, the point of effective attachment to the resilient member 11 is preferably in, or at least substantially in, the plane of the center of gravity of the weight. The resilient member 11 extends through the hollow portion or recess 15 of the inertia member, and in accordance with our present invention is attached thereto by means of a sleeve or collet 17, which is preferably tapered, and which fits snugly about the resilient member 11. In order to hold the sleeve 17 in tight engaging relation with the inertia member 9 and the resilient member 11, it is provided with one or more radial slits 21 which enable the sleeve to be compressed into an aperture 23 in the member 9 to form a tight joint between the sleeve 17, the resilient member 11, and the inertia member 9. In the skirted or recessed form of weight shown, the aperture 23 is in the substantially solid base portion of the weight, and is preferably slightly tapered.

The slitted sleeve or collet 17 is provided with a tapered end portion or tip 25 which extends inwardly along the resilient member 11 from the aperture 23 in the inertia member toward the clamping member 13, thereby forming a flexible support for the resilient member at its point of engagement with the inertia member and protecting it from fatigue failure at this point. This is especially important in dampers having inertia members of the preferred cup-shape type attached to the resilient member substantially at their centers of gravity, as inertia members of this type oscillate more freely than other types and consequently put more stress on the resilient member at its points of attachment thereto. Additional advantages accruing from the use of sleeves or collets of this type are that the manufacture and assembly of dampers are thereby simplified and made less costly, and that the appearance of the assembled dampers is improved. Another important advantage is that traces of moisture which collect within the recess 15 and tend to "crawl" along the walls of the recess to the aperture 23, where they cause corrosion of the resilient member 11 at or near its point of attachment to the inertia member, are shut off from the resilient member by the tapered tip or band 25 at the end of the sleeve, so that the resilient member is further protected.

An aperture 26 may be provided in the lower side of the skirt portion of the inertia member 9 to prevent the collecting of material quantities of water in the recess 15, if desired.

The preferred form of clamp 13 shown in Figs. 3 and 4 consists of a clamp body 27 and a clamp arm 28, having curved or grooved faces adapted to tightly engage the transmission line conductor 3 between them when the clamp is in its closed position shown in Fig. 4. The clamp body 27 has a grooved portion or seat in which the smaller arm 28 is moved by a set screw or bolt 29 to engage or disengage the transmission line. By this construction, installation of the damper is made easy, and for this reason this type of clamp is preferred. In order to prevent fatigue failure of the resilient member at its points of attachment to the clamp 13, the lower portion of the clamp, which engages the resilient member, is preferably reduced in cross section at its ends 30, so that the ends terminate in tapered metal bands or tips surrounding the resilient member and adapted to provide flexible support therefor.

The number of our improved dampers to be used on any span of a transmission line depends on the length of the span and other factors ordinarily considered in determining the number of dampers of previously known types to be employed.

While our invention has been described with special reference to an embodiment thereof which is now preferred, it is to be understood that it may be otherwise embodied within the scope of the appended claims without departing from the spirit of our invention.

We claim:

1. In a vibration damper comprising inertia members engaging the ends of a resilient member which is intermediately engaged by a clamp adapted to secure the damper to a transmission line, a radially slitted sleeve enclosing a part of the resilient member engaged by an inertia member and compressed to effect the engagement, said sleeve having a tapered portion extending inwardly from the engaged portion and adapted to provide flexible support for the resilient member.

2. A vibration damper for transmission lines and the like, comprising a resilient member engaged intermediate its ends by a clamp adapted to engage a transmission line to secure the damper thereto, and a pair of inertia members having apertures therein and disposed at the ends of said resilient member, each of said inertia members having a slitted sleeve extending into its aperture and compressed therein to securely join the inertia member to the said resilient member, the sleeve having a portion extending inwardly from the aperture and enclosing a portion of the resilient member adjacent thereto and adapted to give flexible support to said portion of the resilient member.

3. In a vibration damper of the class described, an inertia member having a substantially cylindrical skirt defining a recess and a substantially solid end portion integral with the skirt and provided with a relatively small aperture communicating with said recess, and a resilient supporting member extending through said recess and secured to said inertia member by a tapered radially slitted collet engaged therewith in said aperture and adapted to reinforce a portion of the resilient member within the said recess.

4. A vibration damper of the class described, comprising a resilient member engaged intermediate its ends by a clamping member, said clamping member being adapted to secure the damper to a transmission line and having a portion engaging the resilient member which terminates in tapered metal bands surrounding the resilient member adjacent its point of engagement and adapted to provide flexible support therefor, an inertia member disposed at the end of the said resilient member, said inertia member having a substantially longitudinal aperture therein and a slitted sleeve surrounding the resilient member within the aperture and compressed to firmly secure the inertia member to the resilient member and having a tapered portion surrounding a part of the resilient member extending toward the clamping member from the inertia member and adapted to provide flexible support therefor.

5. In a vibration damper of the class described, a clamping member comprising a clamp body having a curved gripping portion at its upper end, an intermediate seating portion, and a lower portion adapted to fixedly engage the resilient member of the damper, and a clamp arm slidably mounted in said seating portion of the clamp body and having a face portion adapted to cooperate with the gripping portion of the clamp body to secure the damper to a transmission line, the said lower portion of the clamp body being provided with tapered band portions surrounding and supporting the said resilient member.

6. In a vibration damper for electrical transmission lines and the like, a resilient member, inertia members engaging said resilient member, a clamping member engaging said resilient member and adapted to secure the damper to a transmission line, one of said members engaging said resilient member having a tapered tip surrounding said resilient member adjacent a point of engagement, said tip being adapted to provide flexible support for the said resilient member.

ROBERT A. MONROE.
RICHARD L. TEMPLIN.